United States Patent
Sajdak et al.

(10) Patent No.: US 10,166,664 B2
(45) Date of Patent: Jan. 1, 2019

(54) FASTENER REMOVAL TOOL AND METHOD OF USING SAME

(71) Applicant: General Electric Company, Schenectady, NY (US)

(72) Inventors: Lukasz Sajdak, Warsaw (PL); Kamil Koszarny, Warsaw (PL); James Bradford Holmes, Fountain Inn, SC (US)

(73) Assignee: General Electric Company, Schenectady, NY (US)

( * ) Notice: Subject to any disclaimer, the term of this patent is extended or adjusted under 35 U.S.C. 154(b) by 691 days.

(21) Appl. No.: 14/878,348

(22) Filed: Oct. 8, 2015

(65) Prior Publication Data

US 2017/0100824 A1   Apr. 13, 2017

(51) Int. Cl.
  *B21J 15/50*   (2006.01)
  *B25B 27/14*   (2006.01)
  (Continued)

(52) U.S. Cl.
  CPC ............ *B25B 27/14* (2013.01); *B21J 15/145* (2013.01); *B21J 15/50* (2013.01); *B25D 3/00* (2013.01);
  (Continued)

(58) Field of Classification Search
  CPC .......... B25B 27/14; B25D 3/00; B21J 15/145; B21J 15/50; Y10T 29/49821;
  (Continued)

(56) References Cited

U.S. PATENT DOCUMENTS

| 1,524,701 A | 2/1925 | Farmer |
| 1,774,328 A | 8/1930 | Huff |

(Continued)

FOREIGN PATENT DOCUMENTS

| DE | 539 301 C | 11/1931 |
| EP | 0459934 A3 | 4/1992 |

(Continued)

OTHER PUBLICATIONS

Extended European Search Report and Opinion issued in connection with corresponding EP Application No. 16192222.4 dated Feb. 27, 2017.

*Primary Examiner* — Sarang Afzali
*Assistant Examiner* — Ruth G Hidalgo-Hernandez
(74) *Attorney, Agent, or Firm* — Armstrong Teasdale LLP (57) ABSTRACT

A tool for removing a fastener head from a fastener includes a body that includes an alignment surface configured to couple substantially flush against a structural surface proximate the fastener head. A blade coupled to the body includes a tip configured to sever the fastener head from the fastener as the blade is moved in a first direction generally parallel to the alignment surface from a first blade position to a second blade position. The tool also includes a force transfer member coupled to the body for movement parallel to a longitudinal axis of the force transfer member. The longitudinal axis is oriented at an acute angle with respect to the first direction. The force transfer member is configured to move the blade from the first blade position to the second blade position in response to an impulse received by the force transfer member.

19 Claims, 7 Drawing Sheets

(51) Int. Cl.
*B21J 15/14* (2006.01)
*B25D 3/00* (2006.01)
*F01D 25/28* (2006.01)
B23D 31/00 (2006.01)
F01D 5/30 (2006.01)

(52) U.S. Cl.
CPC ............ *F01D 25/285* (2013.01); *B23D 31/00* (2013.01); *F01D 5/3053* (2013.01); *F05D 2230/70* (2013.01); *F05D 2230/80* (2013.01); *Y10T 29/49821* (2015.01); *Y10T 29/53943* (2015.01)

(58) Field of Classification Search
CPC .......... Y10T 29/53943; F05D 2230/80; F05D 2230/70; B23D 31/00; F01D 5/3053; F01D 25/285
See application file for complete search history.

(56) References Cited

U.S. PATENT DOCUMENTS

| | | |
|---|---|---|
| 2,990,743 A | 7/1961 | Carlson |
| 3,199,383 A | 8/1965 | Gudmestad |
| 3,820,474 A | 6/1974 | Backteman et al. |
| 4,317,391 A | 3/1982 | Gudmestad |
| 4,633,586 A * | 1/1987 | Yawn ...................... B25D 3/00 30/168 |
| 5,758,403 A | 6/1998 | Fallandy |
| 5,813,109 A | 9/1998 | Ziegler et al. |
| 5,836,069 A | 11/1998 | Fallandy et al. |
| 5,981,895 A | 11/1999 | Grace et al. |
| 6,276,588 B1 | 8/2001 | Johnson |
| 7,073,245 B2 | 7/2006 | Alexander et al. |
| 7,096,564 B2 | 8/2006 | Sullivan |
| 8,141,765 B2 | 3/2012 | Copperthite |
| 2005/0086792 A1 | 4/2005 | Sullivan |
| 2005/0251991 A1 | 11/2005 | Alexander et al. |
| 2006/0242840 A1 | 11/2006 | Sullivan |
| 2006/0277746 A1 | 12/2006 | Alexander et al. |
| 2011/0266331 A1 | 11/2011 | Copperthite |

FOREIGN PATENT DOCUMENTS

| | | |
|---|---|---|
| EP | 0954889 B1 | 8/2001 |
| EP | 0922519 B1 | 3/2004 |
| WO | 1998032195 A1 | 7/1998 |
| WO | 2010090778 A3 | 8/2010 |

* cited by examiner

FASTENER REMOVAL TOOL AND METHOD OF USING SAME

BACKGROUND

The field of the disclosure relates generally to tools for removing fasteners, and more particularly to a tool for severing a head from a fastener installed in a structure.

At least some known structures are assembled using fasteners, such as, but not limited to, bolts, screws, and rivets. Moreover, at least some such structures require partial disassembly and, thus, removal of the fasteners, for inspection, maintenance, and/or repair. However, in at least some cases, a location of the fasteners with respect to the structure as assembled increases a difficulty in accessing the fasteners to remove the fasteners. As just one non-limiting example, at least some known rotary machines include rotor blades coupled to a rotor assembly using axially disposed twist-lock bolts, and access to the heads of the twist-lock bolts may be restricted when adjacent stages of rotor blades remain coupled to the rotor.

BRIEF DESCRIPTION

In one aspect, a tool for removing a fastener head from a fastener is provided. The fastener head protrudes from a structural surface through which the fastener is installed. The tool includes a body that includes an alignment surface configured to couple substantially flush against the structural surface proximate the fastener head. The tool also includes a blade coupled to the body for movement in a first direction generally parallel to the alignment surface. The blade includes a tip configured to sever the fastener head from the fastener as the blade is moved from a first blade position to a second blade position. The tool further includes a force transfer member coupled to the body for movement parallel to a longitudinal axis of the force transfer member. The longitudinal axis is oriented at an acute angle with respect to the first direction. The force transfer member is configured to move the blade from the first blade position to the second blade position in response to an impulse received by the force transfer member.

In another aspect, a method for removing a fastener head from a fastener using a tool is provided. The fastener head protrudes from a structural surface through which the fastener is installed. The method includes coupling an alignment surface of a body of the tool substantially flush against the structural surface proximate the fastener head. The tool includes a blade coupled to the body for movement in a first direction generally parallel to the alignment surface. The blade includes a tip. The method also includes applying an impulse to a force transfer member. The force transfer member is coupled to the body for movement parallel to a longitudinal axis of the force transfer member. The longitudinal axis is oriented at an acute angle with respect to the first direction. The force transfer member moves the blade from a first blade position to a second blade position in response to the impulse, and the tip severs the fastener head from the fastener as the blade is moved from the first blade position to the second blade position.

In another aspect, a method for removing a fastener from a rotor assembly using a tool is provided. A fastener head of the fastener protrudes from a surface of a rotor blade dovetail through which the fastener is installed. The method includes coupling an alignment surface of a body of the tool substantially flush against the dovetail surface proximate the fastener head. The tool includes a blade coupled to the body for movement in a first direction generally parallel to the alignment surface. The blade includes a tip. The method also includes applying an impulse to a force transfer member. The force transfer member is coupled to the body for movement parallel to a longitudinal axis of the force transfer member. The longitudinal axis is oriented at an acute angle with respect to the first direction. The force transfer member moves the blade from a first blade position to a second blade position in response to the impulse, and the tip severs the fastener head from the fastener as the blade is moved from the first blade position to the second blade position. The method further includes removing the fastener from the dovetail.

DETAILED DESCRIPTION

The exemplary tool and methods described herein overcomes at least some of the disadvantages associated with known fastener-removal tools. The embodiments described herein provide a body with an alignment surface configured to couple substantially flush against a surface from which the fastener head protrudes, a blade coupled to the body for movement generally parallel to the body alignment surface, and a force transfer member coupled to the body at an acute angle with respect to the blade movement direction. An impulse delivered to the force transfer member actuates the blade.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Approximating language may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be identified. Such ranges may be combined and/or interchanged, and include all the subranges contained therein unless context or language indicates otherwise.

Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

Figure 1:
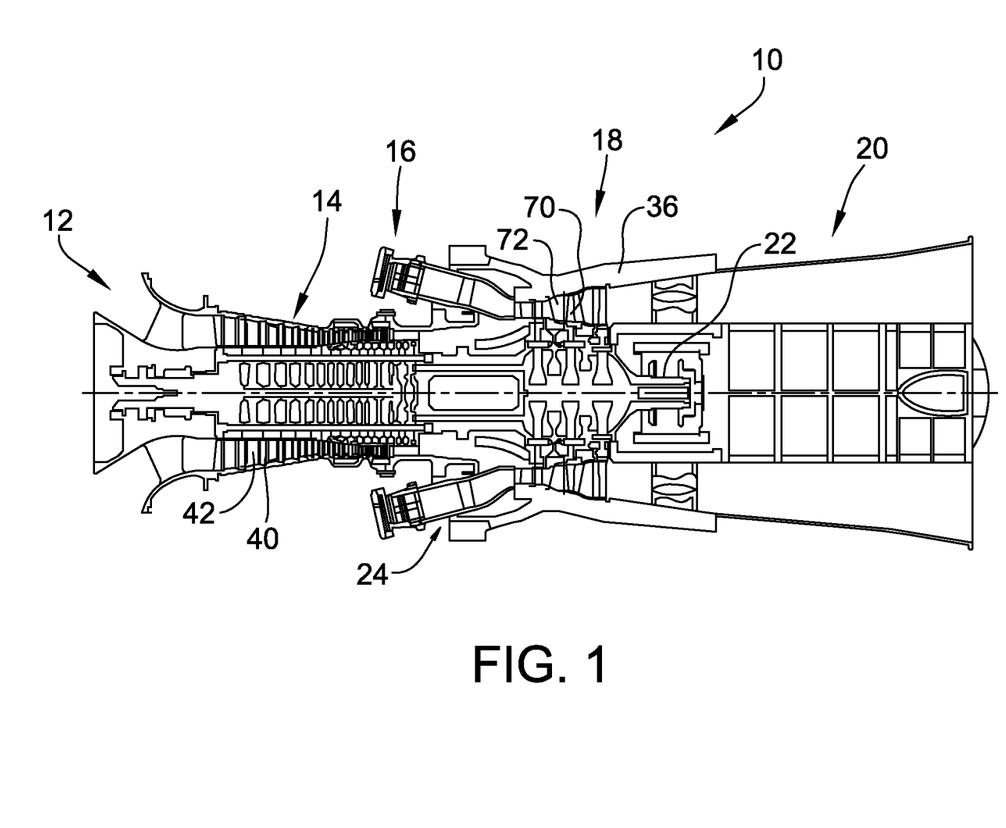
FIG. 1 is a schematic section view of an exemplary rotary machine.

FIG. 1 is a schematic section view of an exemplary rotary machine 10 with which embodiments of the current disclosure may be used. In the exemplary embodiment, rotary machine 10 is a gas turbine that includes an intake section 12, a compressor section 14 coupled downstream from intake section 12, a combustor section 16 coupled downstream from compressor section 14, a turbine section 18 coupled downstream from combustor section 16, and an exhaust section 20 coupled downstream from turbine section 18. A generally tubular casing 36 at least partially encloses one or more of intake section 12, compressor section 14, combustor section 16, turbine section 18, and exhaust section 20. Although embodiments of the current disclosure are described with respect to rotary machine 10, the current disclosure applies to any structure that includes fasteners for which the embodiments of the current disclosure are capable of functioning as described herein.

In the exemplary embodiment, turbine section 18 is coupled to compressor section 14 via a rotor assembly 22. It should be noted that, as used herein, the term "couple" is not limited to a direct mechanical, electrical, and/or communication connection between components, but may also include an indirect mechanical, electrical, and/or communication connection between multiple components.

During operation of gas turbine 10, intake section 12 channels air 11 towards compressor section 14. Compressor section 14 compresses the air to a higher pressure and temperature. More specifically, rotor assembly 22 imparts rotational energy to at least one circumferential row of compressor blades 40 coupled to rotor assembly 22 within compressor section 14. In the exemplary embodiment, each row of compressor blades 40 is preceded by a circumferential row of compressor stator vanes 42 extending radially inward from casing 36 that direct the air flow into compressor blades 40. The rotational energy of compressor blades 40 increases a pressure and temperature of the air. Compressor section 14 discharges the compressed air towards combustor section 16.

In combustor section 16, the compressed air is mixed with fuel and ignited to generate combustion gases that are channeled towards turbine section 18. More specifically, combustor section 16 includes at least one combustor 24, in which a fuel, for example, natural gas and/or fuel oil, is injected into the air flow, and the fuel-air mixture is ignited to generate high temperature combustion gases that are channeled towards turbine section 18.

Turbine section 18 converts the thermal energy from the combustion gas stream to mechanical rotational energy. More specifically, the combustion gases impart rotational energy to at least one circumferential row of rotor blades 70 coupled to rotor assembly 22 within turbine section 18. In the exemplary embodiment, each row of rotor blades 70 is preceded by a circumferential row of turbine stator vanes 72 extending radially inward from casing 36 that direct the combustion gases into rotor blades 70. Rotor assembly 22 may be coupled to a load (not shown) such as, but not limited to, an electrical generator and/or a mechanical drive application. The exhausted combustion gases flow downstream from turbine section 18 into exhaust section 20. Components of rotary machine 10, such as, but not limited to, rotor blades 70, are coupled together using bolts.

Figure 2:
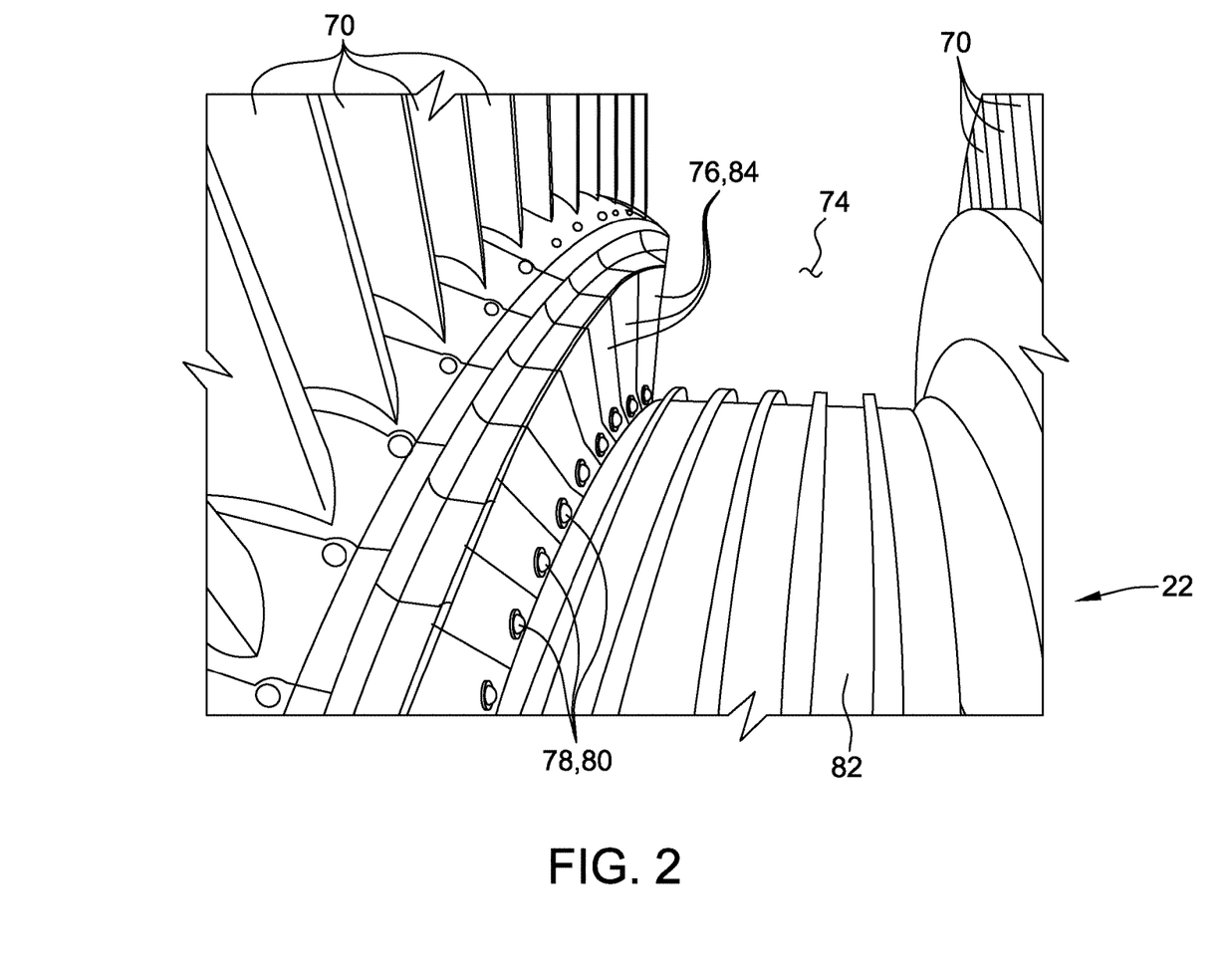
FIG. 2 is a schematic perspective view of an exemplary confined space disposed axially between two adjacent rows of exemplary rotor blades of a rotary machine, such as the exemplary rotary machine shown in FIG. 1.

FIG. 2 is a schematic perspective view of an exemplary confined space 74 disposed axially between two adjacent rows of exemplary rotor blades 70 of turbine section 18 (shown in FIG. 1). More specifically, in the view of FIG. 2, turbine section 18 is at least partially disassembled, such that stator vanes 72 are no longer disposed between the rows of rotor blades 70. A spacer 82 is coupled between the adjacent rows of rotor blades 70. Each rotor blade 70 includes a dovetail 76 coupled to rotor assembly 22 by an axially extending (i.e., parallel to rotor assembly 22) fastener 78. Each fastener 78 includes a fastener head 80 that protrudes from a structural surface 84 through which the fastener 78 is installed. For example, but not by way of limitation, each fastener 78 is a twist-lock bolt, and each fastener head 80 extends into confined space 74 from surface 84 of dovetail 76 adjacent confined space 74.

Figure 3:
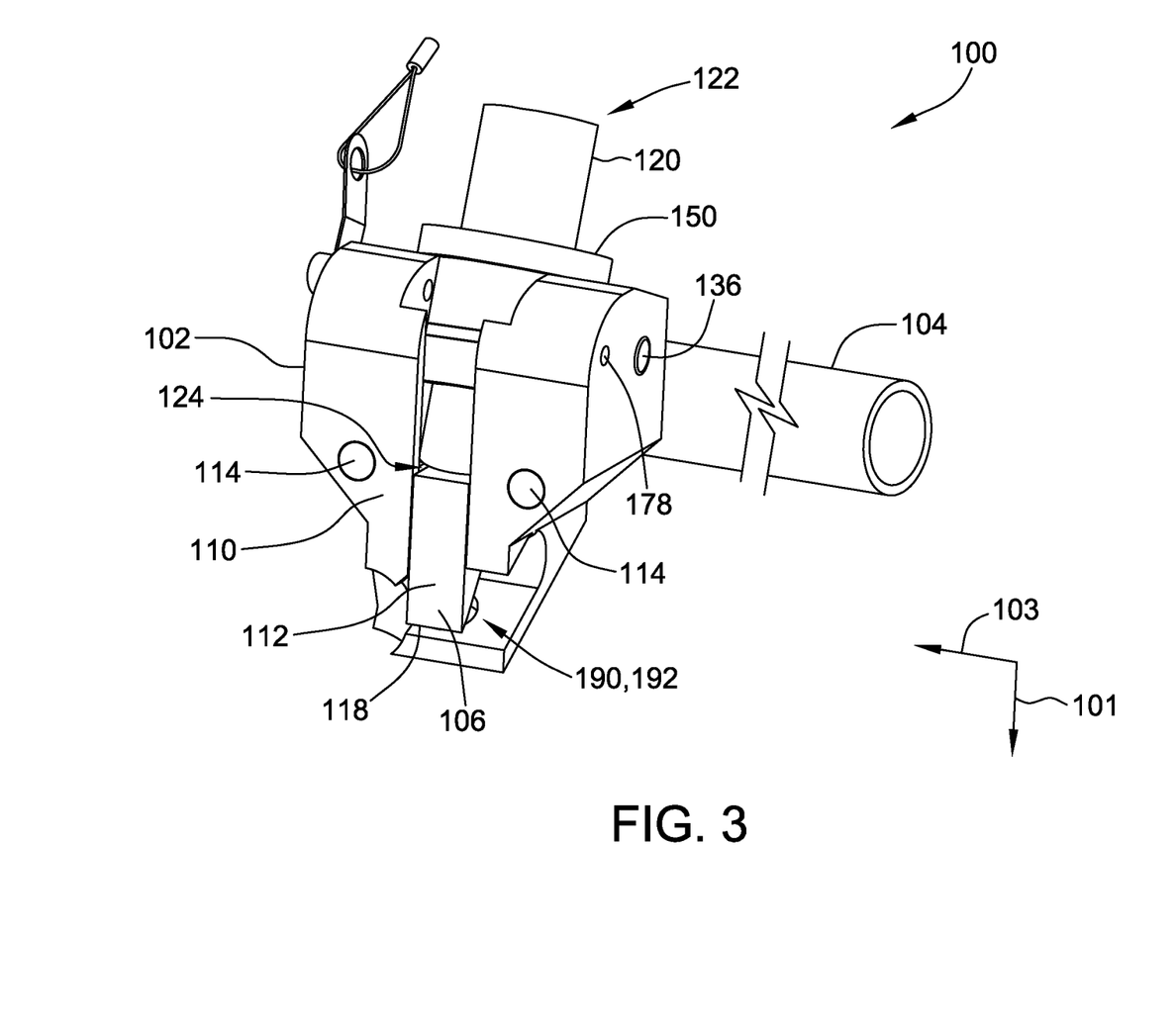
FIG. 3 is a schematic perspective view of an exemplary tool configured to be deployed, such as within the confined space shown in FIG. 2, to remove fastener heads from exemplary fasteners.
Figure 4:
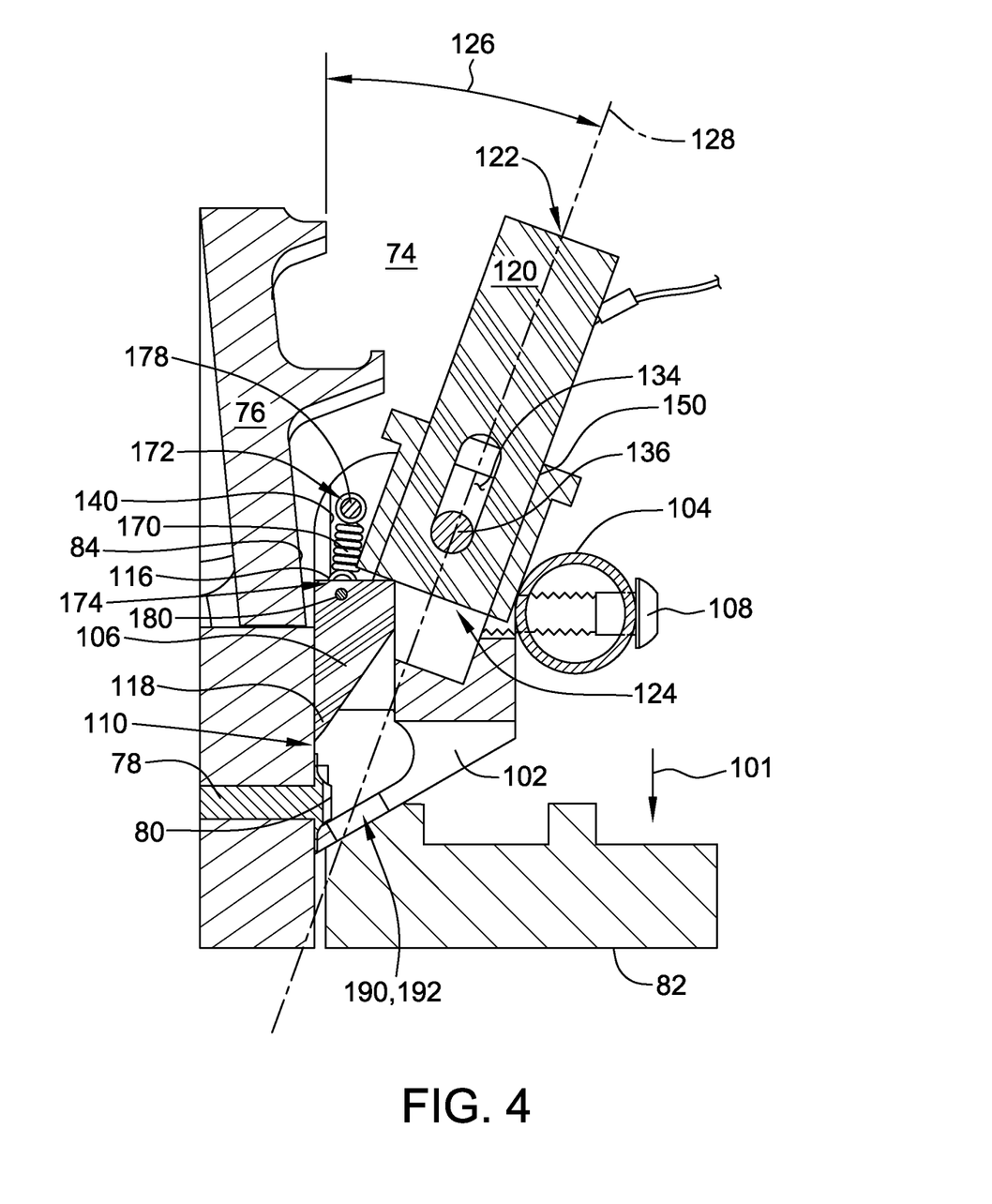
FIG. 4 is a sectional view of the exemplary tool shown in FIG. 3 with a blade of the tool in a first blade position.
Figure 5:
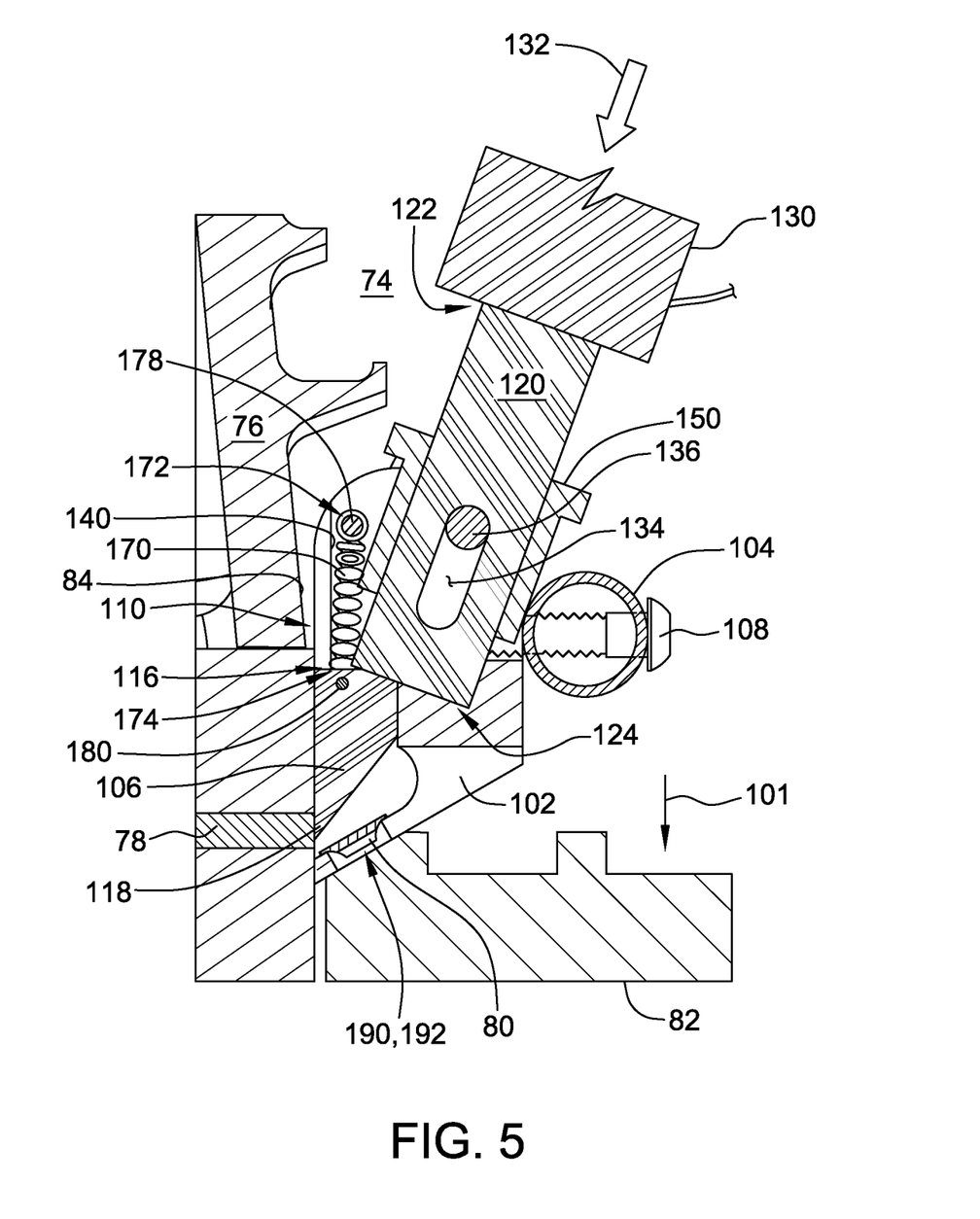
FIG. 5 is a sectional view of the exemplary tool shown in FIG. 3 with a blade of the tool in a second blade position.

FIG. 3 is a schematic perspective view of an exemplary tool 100 configured to be deployed, such as within confined space 74 (shown in FIG. 2), to remove fastener heads 80 from fasteners 78. FIG. 4 is a sectional view of tool 100 deployed in confined space 74, with a blade 106 of tool 100 in a first blade position. FIG. 5 is a sectional view of tool 100 deployed in confined space 74, with blade 106 of tool 100 in a second blade position.

With reference to FIGS. 3-5, in the exemplary embodiment, tool 100 includes a body 102, and a handle 104 coupled to body 102 via at least one fastener 108. In alternative embodiments, body 102 and handle 104 are coupled in any suitable fashion, including by being integrally formed together. An alignment surface 110 of body 102 is configured to couple substantially flush against surface 84 proximate fastener head 80. In the exemplary embodiment, handle 104 is configured to enable one-handed positioning of tool 100 within confined space 74 such that alignment surface 110 of body 102 is substantially flush against surface 84 proximate fastener head 80. Moreover, handle 104 enables the user's hand that controls a position of tool 100 to simultaneously be positioned at a safe distance from a hammer strike or other impulse delivered to tool 100, as will be described herein. In alternative embodiments, handle 104 has any suitable configuration that enables tool 100 to function as described herein. In other alternative embodiments, tool 100 does not include handle 104.

Tool 100 also includes blade 106 movably coupled to body 102 for movement, with respect to body 102 parallel to a first direction 101, between the first blade position and the second blade position (shown in FIGS. 4 and 5, respectively). First direction 101 is generally parallel to body alignment surface 110. In the exemplary embodiment, tool 100 is coupled to surface 84 such that first direction 101 points substantially radially inwardly, with respect to rotor assembly 22. In alternative embodiments, tool 100 is coupled to surface 84 such that first direction 101 points other than substantially radially inwardly, with respect to rotor assembly 22.

Blade 106 extends from a base 116 to a tip 118. With tool 100 coupled to surface 84 and blade 106 in the first blade position, tip 118 of blade 106 is configured to be positioned proximate surface 84 and adjacent fastener head 80. As blade 106 is moved from the first blade position to the second blade position, tip 118 is configured to slide into and sever fastener head 80 from fastener 78 proximate surface 84. Movement of blade 106 in first direction 101 parallel to body alignment surface 110 facilitates efficient cutting through fastener 78 while avoiding damage to surface 84 and/or other structure adjacent confined space 74.

In the exemplary embodiment, body 102 includes at least one magnet 114 inset on body alignment surface 110. Magnet 114 is configured to releasably secure alignment surface 110 against surface 84 when tool 100 is positioned against surface 84 proximate fastener head 80. For example, magnet 114 is disengageable from surface 84 by a user pulling on handle 104. In alternative embodiments, tool 100 does not include magnet 114.

Tool 100 further includes a force transfer member 120 that extends along a longitudinal axis 128 between a first end 122 and a second end 124. Force transfer member 120 is configured to move blade 106 from the first blade position to the second blade position in response to an impulse 132 received by force transfer member 120. For example, in the exemplary embodiment, force transfer member 120 is coupled to body 102 for movement relative to body 102 in a direction parallel to longitudinal axis 128 between a first transfer position, shown in FIG. 4, and a second transfer position, shown in FIG. 5. First end 122 is configured to receive impulse 132, such as from a hammer 130, and second end 124 is configured to transfer a force of impulse 132 to base 116 of blade 106, such that blade 106 shears fastener head 80 from fastener 78, as described above. For example, in the exemplary embodiment, blade 106 is biased to the first blade position, as will be described herein, and second end 124 of force transfer member 120 is supported by blade base 116, such that force transfer member 120 is supported in the first transfer position. Application of impulse 132 to first end 122 of force transfer member 120 moves force transfer member 120 from the first transfer position to the second transfer position, such that second end 124 of force transfer member 120 drives blade 106 into the second blade position.

In certain embodiments, longitudinal axis 128 of force transfer member 120 is oriented at an acute angle 126 with respect to first direction 101. Acute angle 126 facilitates application of impulse 132 to force transfer member 120 without interference between, for example, hammer 130 and other structure bounding confined space 74, such as portions of dovetail 76 in the exemplary embodiment. For example, in some embodiments, angle 126 is within a range of about 10 degrees to about 45 degrees. For another example, in the illustrated embodiment of FIGS. 3-5, angle 126 is about 30 degrees.

Figure 6:
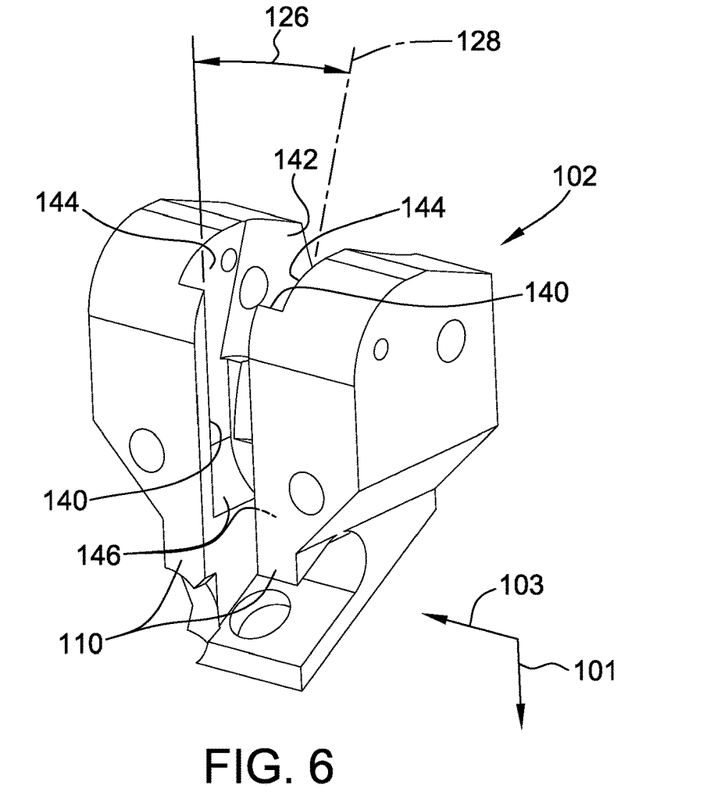
FIG. 6 is a schematic perspective view of an exemplary body of the exemplary tool shown in FIG. 3.
Figure 7:
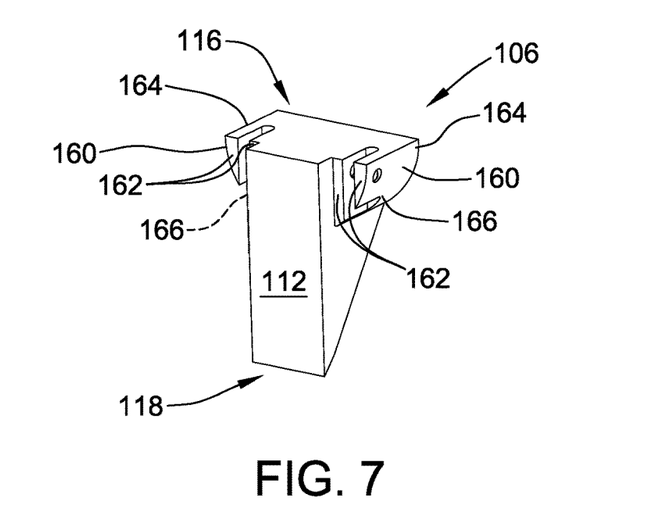
FIG. 7 is a schematic perspective view of an exemplary blade of the exemplary tool shown in FIG. 3.

FIG. 6 is a schematic perspective view of body 102, and FIG. 7 is a schematic perspective view of blade 106. With reference to FIGS. 3-7, in the exemplary embodiment, body 102 is configured to facilitate transfer of the force received from force transfer member 120 at angle 126 to blade 106 moving in first direction 101. More specifically, in the exemplary embodiment, body 102 defines a first interior wall 140 substantially parallel to body alignment surface 110, and a second interior wall 142 configured to be substantially concentric with longitudinal axis 128 of force transfer member 120. First interior wall 140 is configured to guide blade 106 in first direction 101, while second interior wall 142 is configured to guide force transfer member 120 parallel to longitudinal axis 128 into base 116 of blade 106.

Blade 106 includes at least one guide portion 160. First interior wall 140 of body 102 is configured to react against the at least one guide portion 160 as blade 106 moves between the first and second blade positions under the force of impulse 132, such that movement of blade 106 perpendicular to body alignment surface 110 is restricted. More specifically, in the exemplary embodiment, the at least one guide portion 160 includes a pair of oppositely disposed guide portions 160, and each guide portion 160 includes a first guide wall portion 162 configured to bear against first interior wall 140 as blade 106 moves between the first and second blade positions. In alternative embodiments, the at least one guide portion 160 includes any suitable additional or alternative structure configured to restrict movement of blade 106 perpendicular to body alignment surface 110.

Also in the exemplary embodiment, an alignment surface 112 of blade 106 is configured to substantially align with alignment surface 110 of body 102 against surface 84 to further facilitate guiding blade 106 between the first position and the second position. In alternative embodiments, blade 106 does not include blade alignment surface 112 configured to substantially align with alignment surface 110 of body 102 against surface 84.

In the exemplary embodiment, body 102 further defines a third interior wall 144 configured to react against the at least one guide portion 160 as blade 106 moves between the first and second blade positions, such that movement of blade 106 parallel to a second direction 103 is restricted. Second direction 103 is defined perpendicular to first direction 101 in a plane parallel to body alignment surface 110. More specifically, in the exemplary embodiment, the pair of oppositely disposed guide portions 160 each includes a second guide wall portion 164 configured to bear against third interior wall 144 as blade 106 moves between the first and second blade positions. In alternative embodiments, the at least one guide portion 160 includes any suitable additional or alternative structure configured to restrict movement of blade 106 parallel to second direction 103.

In the exemplary embodiment, body 102 further defines a fourth interior wall 146 configured to react against the at least one guide portion 160 as blade 106 moves into the second blade position from the first blade position, such that movement of blade 106 in first direction 101 beyond the second blade position is restricted. More specifically, in the exemplary embodiment, the pair of oppositely disposed guide portions 160 each includes a third guide wall portion 166 configured to bear against fourth interior wall 146 as blade 106 reaches the second blade position. In alternative embodiments, the at least one guide portion 160 includes any suitable additional or alternative structure configured to restrict movement of blade 106 in first direction 101 beyond the second blade position. Guidance and/or restriction of movement of blade 106 by at least one of first interior wall 140, third interior wall 144, and fourth interior wall 146 facilitates efficient cutting through fastener 78 while avoiding damage to surface 84 and/or other structure adjacent confined space 74.

With reference to FIGS. 3-5, in the exemplary embodiment, tool 100 also includes a sleeve 150 coupled to body 102 and configured to slidably receive force transfer member 120 therethrough. In the exemplary embodiment, sleeve 150 is formed from a relatively low-friction material to facilitate movement of force transfer member 120 between the first and second positions. In alternative embodiments, sleeve 150 is formed from any suitable material that enables tool 100 to function as described herein.

In the exemplary embodiment, sleeve 150 is generally tubular in shape and is at least partially received by the complementarily shaped second interior wall 142 defined in body 102. More specifically, second interior wall 142 is contoured to receive sleeve 150 concentrically with longitudinal axis 128 at angle 126, such that sleeve 150 guides force transfer member 120 for movement, relative to body 102, in a direction parallel to longitudinal axis 128.

Also in the exemplary embodiment, sleeve 150 is further secured to body 102 by a pin 136 that extends through sleeve 150 and at least partially through body 102 substantially parallel to second direction 103. For example, pin 136 is a bolt secured to body 102, such as by a suitable threaded portion within body 102 or by a nut (not shown). In alternative embodiments, sleeve 150 is coupled to body 102 in any suitable fashion that enables tool 100 to function as described herein. In other alternative embodiments, tool 100 does not include sleeve 150, and second interior wall 142 is configured to receive force transfer member 120 in another suitable fashion for slidable movement parallel to longitudinal axis 128 at angle 126. For example, second interior wall 142 is configured to bear against force transfer member 120 directly.

In the exemplary embodiment, force transfer member 120 includes a longitudinally extending slot 134 defined therethrough. Moreover, force transfer member 120 is coupled to body 102 by pin 136 extending through slot 134 and at least partially through body 102 (as described above), such that slot 134 permits movement of force transfer member 120 relative to body 102 in a direction parallel to longitudinal axis 128 between the first transfer position, shown in FIG. 4, and the second transfer position, shown in FIG. 5. In alternative embodiments, tool 100 includes any suitable additional or alternative structure that couples force transfer member 120 to body 102 for movement parallel to longitudinal axis 128 between the first and second transfer positions.

In certain embodiments, tool 100 further includes at least one biasing member 170 configured to bias blade 106 towards the first blade position with respect to body 102. For example, in the exemplary embodiment, the at least one biasing member 170 includes a pair of springs 170 disposed on opposite sides of blade 106 with respect to second direction 103. Each spring 170 extends from a first end 172 to a second end 174. First end 172 of each spring 170 is coupled to body 102 by a pin 178 that extends, substantially parallel to second direction 103, through each first end 172 and at least partially through body 102. For example, pin 178 is a bolt secured to body 102, such as by a suitable threaded portion within body 102 or by a nut (not shown). Similarly, second end 174 of each spring 170 is coupled to blade 106 by a pin 180 that extends, substantially parallel to second direction 103, through each second end 174 and at least partially through blade 106. For example, pin 180 is a bolt secured to blade 106, such as by a suitable threaded portion within blade 106 or by a nut (not shown). In alternative embodiments, spring first ends 172 are coupled to body 102, and spring second ends 174 are coupled to blade 106, in any suitable fashion that enables tool 100 to function as described herein.

Springs 170 in an untensioned state cooperate to hold blade 106 in the first blade position relative to body 102. Movement of blade 106 to the second blade position, such as by impulse 132 transferred through force transfer member 120 moving to the second transfer position, places springs 170 in a tensioned state. In addition, springs 170 in a tensioned state cooperate to return blade 106 to the first blade position after the impulse is dissipated. Moreover, springs 170 have a sufficient stiffness such that springs 170 in a tensioned state also cooperate to return force transfer member 120 to the first transfer position, via action of base 116 of blade 106 on second end 124 of force transfer member 120 as blade 106 returns to the first blade position.

In alternative embodiments, at least one biasing member 170 includes any suitable additional or alternative structure that enables the at least one biasing member 170 to function as described herein. In other alternative embodiments, tool 100 does not include the at least one biasing member 170.

In certain embodiments, tool 100 includes a retainer 190 configured to catch and retain severed fastener head 80. For example, in the exemplary embodiment, retainer 190 is implemented as an opening 192 defined in body 102 proximate blade tip 118 in the second blade position. Opening 192 is configured to at least partially receive fastener head 80, to facilitate preventing fastener head 80 from escaping into confined space 74. In alternative embodiments, retainer 190 includes any suitable additional or alternative structure that enables retainer 190 to function as described herein.

Figure 8:
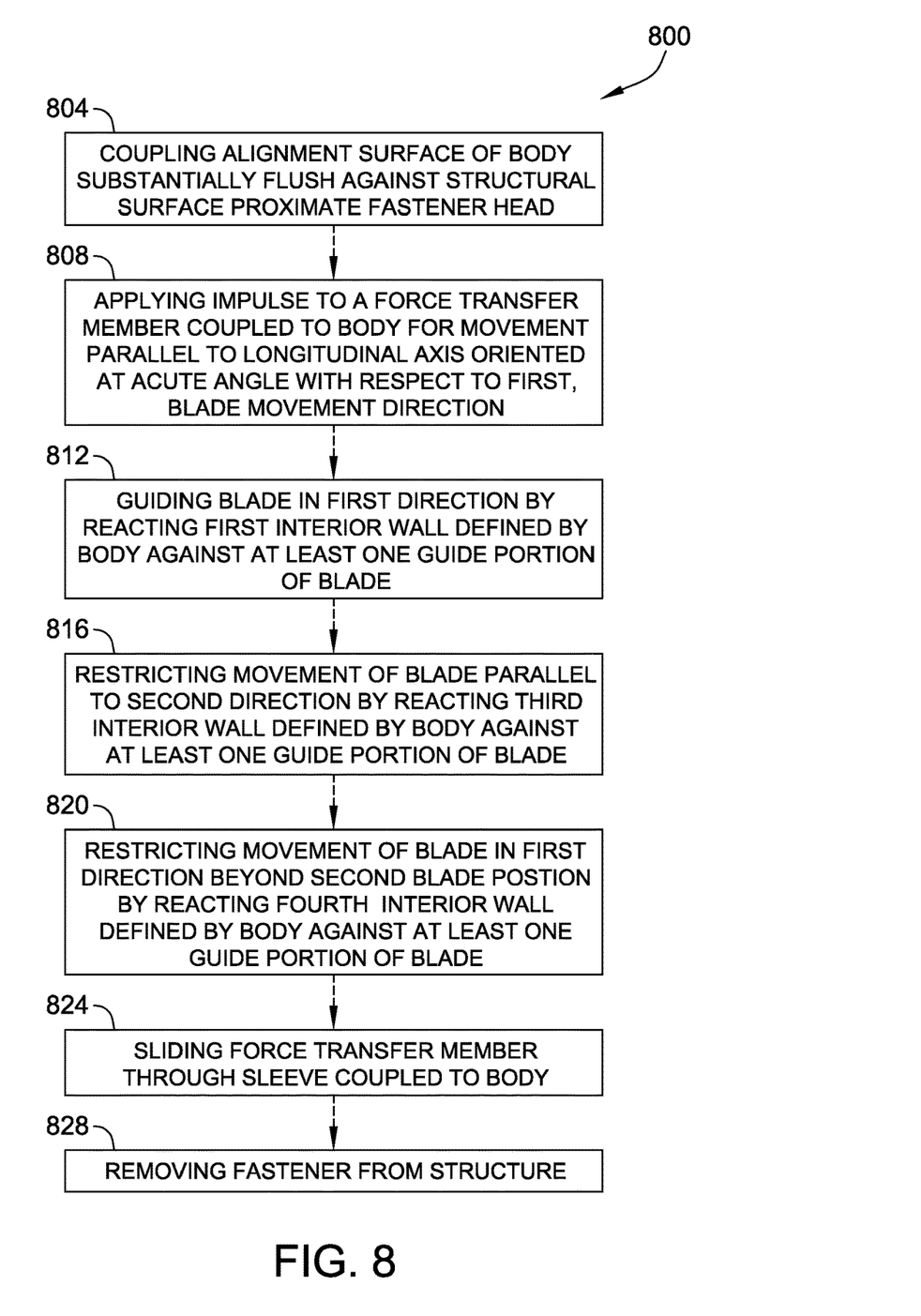
FIG. 8 is a flow diagram of an exemplary embodiment of a method for removing a fastener head from a fastener using a tool, such as the exemplary tool shown in FIG. 3.

An exemplary embodiment of a method 800 for removing a fastener head from a fastener using a tool, such as tool 100, is illustrated in a flow diagram in FIG. 8. The fastener head protrudes from a structural surface through which the fastener is installed. In certain embodiments, the fastener, such as fastener 78, is installed through surface 84 of dovetail 76 of rotor blade 70 of rotor assembly 22, such that fastener head 80 protrudes from dovetail surface 84. In other embodiments, the fastener, such as fastener 78, is installed through any suitable surface 84 of any suitable structure such that fastener head 80 protrudes from surface 84.

With reference to FIGS. 1-8, exemplary method 800 includes coupling 804 an alignment surface of a body of the tool, such as body alignment surface 110, substantially flush against the structural surface proximate the fastener head. The tool includes a blade, such as blade 106, coupled to the body for movement in a first direction generally parallel to the alignment surface, such as first direction 101. The blade includes a tip, such as tip 118.

Method 800 also includes applying 808 an impulse to a force transfer member, such as force transfer member 120. The force transfer member is coupled to the body for movement parallel to a longitudinal axis of the force transfer member, such as longitudinal axis 128. The longitudinal axis is oriented at an acute angle, such as angle 126, with respect to the first direction. The force transfer member moves the blade from a first blade position, such as the position of blade 106 shown in FIG. 4, to a second blade position, such as the position of blade 106 shown in FIG. 5, in response to the impulse. The tip severs the fastener head from the fastener as the blade is moved from the first blade position to the second blade position.

In certain embodiments, the blade includes at least one guide portion, such as guide portions 160. In some such embodiments, the body defines a first interior wall, such as first interior wall 140, substantially parallel to the alignment surface, and method 800 also includes guiding 812 the blade in the first direction by reacting the first interior wall against the at least one guide portion as the blade moves between the first and second blade positions under a force of the impulse. Additionally or alternatively, in some such embodiments, method 800 includes restricting 816 movement of the blade parallel to a second direction, such as second direction 103, by reacting a third interior wall defined by the body, such as third interior wall 144, against the at least one guide portion as the blade moves between the first and second blade positions under a force of the impulse. The second direction is defined perpendicular to the first direction in a plane parallel to the alignment surface. Additionally or alternatively, in some such embodiments, method 800 includes restricting 820 movement of the blade in the first direction beyond the second blade position by reacting a fourth interior wall defined by the body, such as fourth interior wall 146, against the at least one guide portion as the blade moves into the second blade position from the first blade position under a force of the impulse. Additionally or alternatively, in some such embodiments, the body defines a second interior wall, such as second interior wall 142, configured to be substantially concentric with the longitudinal axis of the force transfer member, and method 800 includes sliding 824 the force transfer member through a sleeve, such as sleeve 150, coupled to the body. The sleeve is generally tubular in shape and is at least partially received by the second interior wall.

Moreover, in certain embodiments, method 800 includes removing 828 the fastener from the structure, such as but not limited to dovetail 76 of rotor blade 70. For example, with the fastener head removed, an end of the fastener opposite the fastener head end can be pulled out of the structure.

Exemplary embodiments of a tool for removing a fastener head from a fastener, and methods for using the tool, are described above in detail. The embodiments described herein provide an advantage over known fastener-removal tools by enabling safe and effective operation even in confined spaces. More specifically, the embodiments described herein provide a body alignment surface configured to couple substantially flush against a surface from which the fastener head protrudes, a blade coupled to the body for movement generally parallel to the body alignment surface, and a force transfer member coupled to the body at an acute angle with respect to the blade movement direction. Thus, a hammer, for example, can be swung in a direction non-parallel to the surface to strike the force transfer member and actuate the blade without interference from other nearby structure, while movement of the blade parallel to the surface facilitates efficient cutting through the fastener and avoids damage to the surrounding structure. Some embodiments further provide interior walls defined by the body that facilitate transfer of the impulse from the direction of application to the force transfer member into the desired blade movement direction. Certain embodiments further provide a handle that facilitates proper positioning of the tool in a confined space, with a user's hand positioned at a safe distance from a hammer strike or other impulse delivered to the tool.

The apparatus and methods described herein are not limited to the specific embodiments described herein. For example, components of each apparatus and/or steps of each method may be used and/or practiced independently and separately from other components and/or steps described herein. In addition, each component and/or step may also be used and/or practiced with other assemblies and methods.

While the disclosure has been described in terms of various specific embodiments, those skilled in the art will recognize that the disclosure can be practiced with modification within the spirit and scope of the claims. Although specific features of various embodiments of the disclosure may be shown in some drawings and not in others, this is for convenience only. Moreover, references to "one embodiment" in the above description are not intended to be interpreted as excluding the existence of additional embodiments that also incorporate the recited features. In accordance with the principles of the disclosure, any feature of a drawing may be referenced and/or claimed in combination with any feature of any other drawing.

What is claimed is:

1. A tool for removing a fastener head from a fastener, wherein the fastener head protrudes from a structural surface through which the fastener is installed, said tool comprising:
   a body comprising an alignment surface configured to couple substantially flush against the structural surface proximate the fastener head;
   a blade coupled to said body for movement in a first direction generally parallel to said alignment surface, said blade comprising a tip configured to sever the fastener head from the fastener as said blade is moved from a first blade position to a second blade position;
   a force transfer member coupled to said body for movement parallel to a longitudinal axis of said force transfer member, said longitudinal axis is oriented at an acute angle with respect to the first direction, said force transfer member is configured to move said blade from the first blade position to the second blade position in response to an impulse received by said force transfer member; and
   at least one biasing member coupled to said blade, said at least one biasing member configured to bias said blade towards the first blade position with respect to said body.

2. The tool of claim 1, wherein said body further comprises at least one magnet inset of said alignment surface.

3. The tool of claim 1, wherein said body defines a first interior wall substantially parallel to said alignment surface, said first interior wall is configured to guide said blade in the first direction.

4. The tool of claim 3, wherein said blade further comprises at least one guide portion, said first interior wall is configured to react against said at least one guide portion as said blade moves between the first and second blade positions under a force of the impulse.

5. The tool of claim 1, further comprising a sleeve coupled to said body and configured to slidably receive said force transfer member therethrough.

6. The tool of claim 5, wherein said body defines a second interior wall configured to be substantially concentric with said longitudinal axis of said force transfer member, said sleeve is generally tubular in shape and is at least partially received by said second interior wall.

7. The tool of claim 1, wherein said blade further comprises at least one guide portion, said body defines a third interior wall configured to react against said at least one guide portion as said blade moves between the first and second blade positions under a force of the impulse, such that movement of said blade parallel to a second direction is restricted, wherein the second direction is defined perpendicular to the first direction in a plane parallel to said alignment surface.

8. The tool of claim 1, wherein said blade further comprises at least one guide portion, said body defines a fourth interior wall configured to react against said at least one guide portion as said blade moves into the second blade position from the first blade position under a force of the impulse, such that movement of said blade in the first direction beyond the second blade position is restricted.

9. The tool of claim 1, wherein said body defines a second interior wall configured to be substantially concentric with said longitudinal axis of said force transfer member.

10. A method for removing a fastener head from a fastener using a tool, wherein the fastener head protrudes from a structural surface through which the fastener is installed, said method comprising:

coupling an alignment surface of a body of the tool substantially flush against the structural surface proximate the fastener head, wherein the tool includes a blade coupled to the body for movement in a first direction generally parallel to the alignment surface, the blade including a tip;

applying an impulse to a force transfer member, the force transfer member coupled to the body for movement parallel to a longitudinal axis of the force transfer member, the longitudinal axis oriented at an acute angle with respect to the first direction, wherein:

the force transfer member moves the blade from a first blade position to a second blade position in response to the impulse, and the tip severs the fastener head from the fastener as the blade is moved from the first blade position to the second blade position; and wherein the tool includes at least one biasing member coupled to the blade configured to return the blade to the first blade position.

11. The method of claim 10, wherein the body defines a first interior wall substantially parallel to the alignment surface and the blade includes at least one guide portion, said method further comprising guiding the blade in the first direction by reacting the first interior wall against the at least one guide portion as the blade moves between the first and second blade positions under a force of the impulse.

12. The method of claim 10, wherein the blade includes at least one guide portion, said method further comprising restricting movement of the blade parallel to a second direction by reacting a third interior wall defined by the body against the at least one guide portion as the blade moves between the first and second blade positions under a force of the impulse, wherein the second direction is defined perpendicular to the first direction in a plane parallel to the alignment surface.

13. The method of claim 10, wherein the blade includes at least one guide portion, said method further comprising restricting movement of the blade in the first direction beyond the second blade position by reacting a fourth interior wall defined by the body against the at least one guide portion as the blade moves into the second blade position from the first blade position under a force of the impulse.

14. The method of claim 10, wherein the body defines a second interior wall configured to be substantially concentric with the longitudinal axis of the force transfer member, said method further comprising sliding the force transfer member through a sleeve coupled to the body, wherein the sleeve is generally tubular in shape and is at least partially received by the second interior wall.

15. A method for removing a fastener from a rotor assembly using a tool, wherein a fastener head of the fastener protrudes from a surface of a rotor blade dovetail through which the fastener is installed, said method comprising:

coupling an alignment surface of a body of the tool substantially flush against the dovetail surface proximate the fastener head, wherein the tool includes a blade coupled to the body for movement in a first direction generally parallel to the alignment surface and radially inward with respect to the rotor assembly, the blade including a tip;

applying an impulse to a force transfer member, the force transfer member coupled to the body for movement parallel to a longitudinal axis of the force transfer member, the longitudinal axis oriented at an acute angle with respect to the first direction, wherein:

the force transfer member moves the blade from a first blade position to a second blade position in response to the impulse, and the tip severs the fastener head from the fastener as the blade is moved from the first blade position to the second blade position;

wherein at least one biasing member coupled to the blade returns the blade to the first blade position; and removing the fastener from the dovetail.

16. The method of claim 15, wherein the body defines a first interior wall substantially parallel to the alignment surface and the blade includes at least one guide portion, said method further comprising guiding the blade in the first direction by reacting the first interior wall against the at least one guide portion as the blade moves between the first and second blade positions under a force of the impulse.

17. The method of claim 15, wherein the blade includes at least one guide portion, said method further comprising restricting movement of the blade parallel to a second direction by reacting a third interior wall defined by the body against the at least one guide portion as the blade moves between the first and second blade positions under a force of the impulse, wherein the second direction is defined perpendicular to the first direction in a plane parallel to the alignment surface.

18. The method of claim 15, wherein the blade includes at least one guide portion, said method further comprising restricting movement of the blade in the first direction beyond the second blade position by reacting a fourth interior wall defined by the body against the at least one guide portion as the blade moves into the second blade position from the first blade position under a force of the impulse.

19. The method of claim 15, wherein the body defines a second interior wall configured to be substantially concentric with the longitudinal axis of the force transfer member, said method further comprising sliding the force transfer member through a sleeve coupled to the body, wherein the sleeve is generally tubular in shape and is at least partially received by the second interior wall.

* * * * *

UNITED STATES PATENT AND TRADEMARK OFFICE
CERTIFICATE OF CORRECTION

PATENT NO. : 10,166,664 B2  
APPLICATION NO. : 14/878348  
DATED : January 1, 2019  
INVENTOR(S) : Lukasz Sajdak et al.

Page 1 of 1

It is certified that error appears in the above-identified patent and that said Letters Patent is hereby corrected as shown below:

In the Claims

In Claim 2, Column 10, Line 27, delete "inset of said alignment surface" and insert therefore -- inset on said alignment surface --.

Signed and Sealed this
Twenty-seventh Day of June, 2023

Katherine Kelly Vidal
*Director of the United States Patent and Trademark Office*